United States Patent Office 3,462,241
Patented Aug. 19, 1969

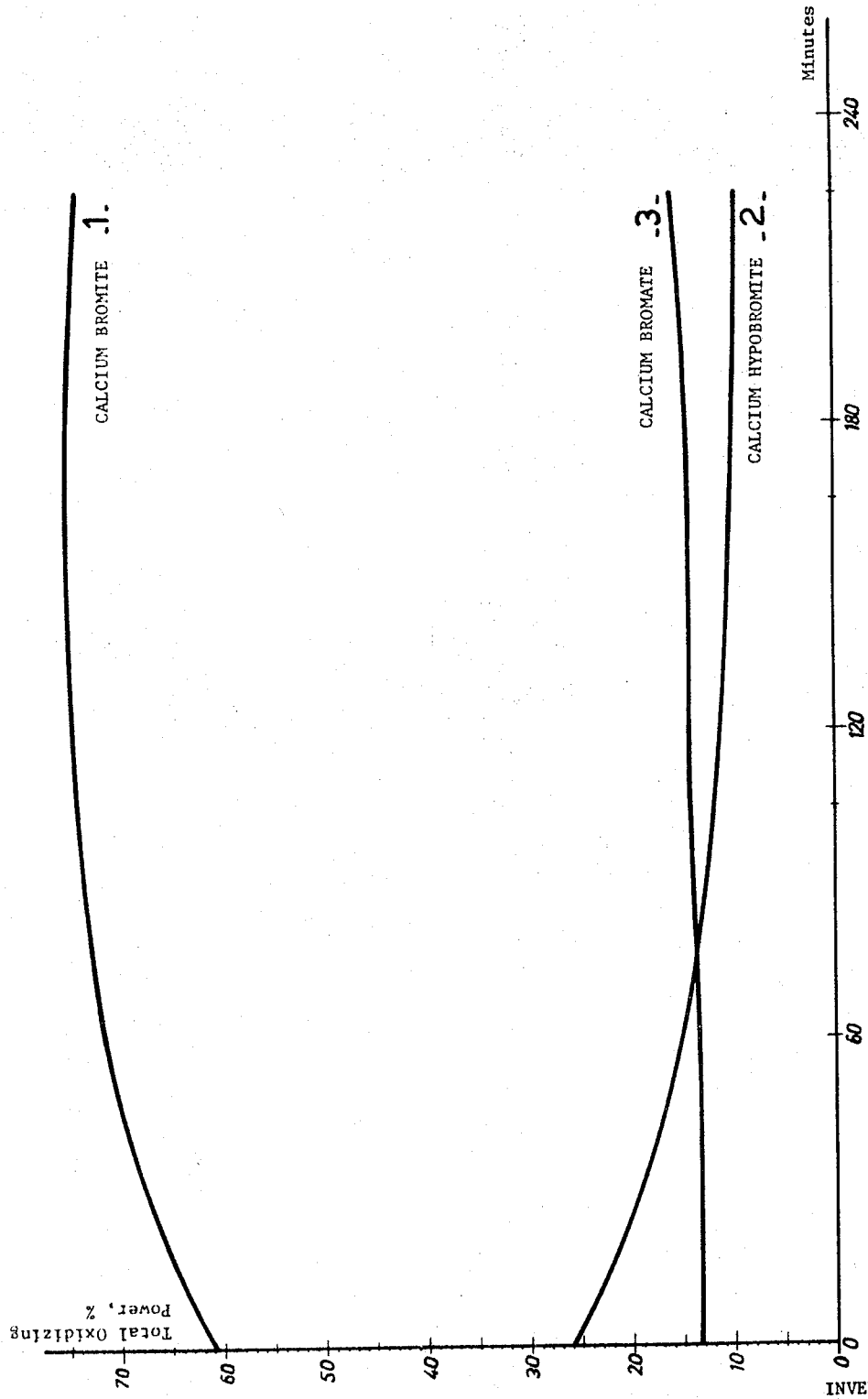

3,462,241
DIRECT PRODUCTION OF SOLID
CALCIUM BROMITE
Michel Sediey, Asnieres, France, assignor to Societe
d'Etudes Chimiques pour l'Industrie et l'Agriculture, Paris, France
Filed July 17, 1967, Ser. No. 653,941
Claims priority, application France, July 22, 1966, 70,406; May 16, 1967, 106,449; May 22, 1967, 107,138
Int. Cl. C01f 11/34; C01b 7/10
U.S. Cl. 23—85          12 Claims

ABSTRACT OF THE DISCLOSURE

Producing calcium bromite in solid form by mixing bromine and calcium hydroxide at below 20° C., regulating the pH during the mixing step, or alternatively maintaining substantially equimolar proportions of bromine and calcium hydroxide during the latter part of the mixing step; and after the mixing step is completed, adjusting the pH to about 9.3–10.5; then allowing the reaction to continue until the quantity of hypobromite remaining in the mixture represents less than about 15% of the total oxidizing power of the mixture; and thereafter recovering the solid precipitate.

---

This invention relates to a process for the production of calcium bromite, particularly to a process wherein calcium bromite is obtained directly in solid form.

In United States Patent 3,085,854, issued on Apr. 16, 1963, to the assignee of this invention, there is described a process for preparing concentrated solutions of alkali metal and alkaline earth metal bromites, particularly for preparing an aqueous solution of calcium bromite by conversion of a calcium hypobromite solution containing 300–330 g./l. of available bromine, the initial pH being adjusted to 10.6–10.9 and the temperature maintained at about 0° C. during the conversion. However, in contrast to other alkali metal and alkaline earth metal bromites, solid calcium bromite cannot be obtained satisfactorily by concentrating solutions thereof for, whatever the method used, the bromite is decomposed to a large extent during the concentration.

In United States Patents 3,095,267, issued on June 25, 1963, and 3,178,262, issued on Apr. 13, 1965, to the assignee of this invention, there is further described a process for preparing barium and strontium bromites directly in the solid form by conversion of barium or strontium hypobromites suspended in an aqueous saturated solution of the hypobromite contemplated. According to said process, a suspension of the solid hypobromite is prepared, the pH of the suspension is adjusted between about 10.5 and 11.5, and the temperature is maintained at room temperature or lower, preferably at about 0° C. When the conversion of hypobromite to bromite has attained its maximum, a hydroxide of barium or strontium, as the case may be, added to the suspension in sufficient quantity to raise the pH of the solution to at least about 12.9, is used, thereby precipitating a solid comprising essentially barium or strontium bromite and, as the main impurity, barium or strontium bromate.

It is also known that barium and strontium bromites are excellent starting materials for the preparation of alkali metal bromites by double decomposition with a water-soluble alkali metal salt (the resulting product being an insoluble barium or strontium salt), such as an alkali metal sulfate or carbonate.

Attempts have, of course, been made to prepare solid calcium bromite as well because, from industrial considerations, the latter is more attractive than the other alkaline earth metal bromites, lime as a starting material being much less expensive than baryta or strontiane. It is to be noted that whereas the above-described process gives excellent results when preparing barium or strontium salts, it is not so applicable in the case of the calcium salt. Furthermore, it is even impossible to obtain directly a workable starting suspension of calcium hypobromite in a saturated solution thereof by the simple method used for preparing barium and strontium hypobromites. This latter simple method, comprising the addition of bromine to a suspension of the corresponding hydroxide, is not satisfactory because in the case of lime, beyond a weight ratio (Ca(OH)$_2$/water of 10–15%, the mixture becomes very thick and leads very quickly to caking. Moreover, it is not possible to obtain a calcium hypobromite suspension by concentrating a saturated solution thereof.

SUMMARY OF THE INVENTION

A principal object of this invention is to provide an improved process wherein calcium bromite is prepared directly in solid form. The bromite so obtained economically can then be used to prepare alkali metal bromites which are commercially used, e.g. in the desizing of cellulose fabrics.

Upon further study of the specification and claims other objects and advantages of the present invention will become apparent.

To attain these objects there is provided a process comprising:

A. Mixing bromine and calcium hydroxide (hydrated lime) optionally with calcium hypochlorite, the mixing conditions being:

(1) at lower than about 20° C. to higher than the freezing point of the mixture;
(2) during the entire mixing step maintaining the pH of the mixture higher than about 10;
(3) during at least the period after the quantity of calcium bromide reaches 20% by weight of the mixture until the end of the mixing step, providing at least one of the follwoing:
   (a) adjusting the addition of calcium hydroxide and bromine to the mixture to maintain a pH lower than 11 in the absence of hypochlorite and lower than 11.8 in the presence of hypochlorite,
   (b) maintaining a substantially equimolar addition of bromine and calcium hydroxide in and to the mixture;

B. After the addition of reagents is completed, adjusting the pH to about a range of 9.3–10.5, if not already in said range;

C. Reacting the constituents of the mixture sufficiently to obtain a precipitate comprising a major amount by weight of calcium bromite; and D. Recovering the resultant precipitate from its mother liquor.

In connection with step C, a preferred embodiment of this invention is to continue the reaction until the content of calcium hypobromite remaining in the mixture represents less than about 15% of the total oxidizing power of the mixture.

BRIEF DESCRIPTION OF THE DRAWING

The attached drawing graphically illustrates the effect of reaction time on the yields of calcium bromite, hypobromite, and bromate.

DETAILED DESCRIPTION OF PROCESS PARAMETERS

It is of course advantageous to operate the process in a medium as concentrated as possible but it has been found that the weight ratio Ca(OH)$_2$/water should not exceed about 45%. The bromite yield tends to decrease when the concentration of the reaction medium exceeds a certain limit which corresponds to a Ca(OH)₂/water ratio of about 40%. Thus, it is advisable to operate at a Ca(OH)₂/water ratio comprised between about 30 and about 40%. (This ratio is defined, taking 30% as an example, as 30 parts of Ca(OH $_2$ present per 100 parts of water.)

When using hydrated lime (i.e. Ca(OH)₂) and calcium hypochlorite as a reagent, the proportion of the latter should be chosen so that the molar ratio hypochlorite/lime does not exceed 1.5. The hypochlorite used can be any product containing calcium hypochlorite, and in particular, a commercial grade product. More specifically, the most usual commercial products used, are those containing hypochlorite in the form of one of the following salts: neutral dihydrated calcium hypochlorite Ca(ClO)₂·2H₂O, hemibasic calcium hypochlorite

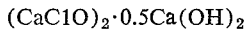

or dibasic calcium hypochlorite Ca(ClO)₂·2Ca(OH)₂.

The commercial grade products usually contain, besides hypochlorite in one of the above specified forms, free lime and other impurities such as calcium chloride and calcium carbonate. These impurities do not deleteriously affect the reaction for the formation of bromite, but obviously when calculating the quantity of bromine to be added, all the lime contained in the hypochloride used must be taken into account whether it be chemically bound or in the free state.

The use of calcium hypochlorite is advantageous as it contributes to the direct production of a solid richer in calcium bromite, and much poorer in the undesired calcium bromide.

According to an embodiment of the present invention, the reagents are introduced in the mixing vessel simultaneously or alternately in such quantities that right from the beginning of the addition, the proportions of bromine and lime are substantially stoichiometrical. In this case, the hypochlorite and lime can be added either separately or together in the form of a suspension containing the desired quantities of hypochlorite and lime.

According to another embodiment of the present invention, milk of lime or an aqueous suspension of calcium hypochlorite optionally containing lime is introduced first into the mixing vessel as a bottom layer. When said bottom layer contains lime, bromine alone is added until the mixture contains a proportion of substantially 1 mol of bromine per 1 mol of lime. Under these conditions the quantity of lime present in the bottom layer should be selected so that the proportion of calcium bromide formed by the following reaction:

is lower than 20%, preferably lower than 15% by weight, when the quantity of bromine added reaches substantially stoichiometrical proportions. Milk of lime and bromine are then added either alternately or simultaneously, while the feed rates are controlled during all the addition so as to maintain in the mixture proportions close to stoichiometrical.

Satisfactory results have been obtained when the feed rate of reagents is adjusted so that the stoichiometric excess of lime is below 1% by weight of the mixture.

The proportions of reagents in the mixture can also be controlled by only adjusting the pH value. By this mode of operation, when using hydrated lime alone as the starting material, satisfactory results are obtained by adjusting the feeding rates of the reagents (bromine and milk of lime) so that the pH of the mixture is 10–11, preferably 10.2–10.8. In the presence of hypochlorite, the addition of reagents is controlled so that the pH is about 10–11.8. Within these limits, it is preferable to operate close to the lower pH when the quantity of hypochlorite used is low. For example, it is advantageous to operate at a pH of 10–11 when the molar ratio of hypochlorite/lime does not exceed about 0.5.

In a preferred embodiment of the present invention, the addition of bromine and/or milk of lime is automatically adjusted in response to the pH measured in the reactor. Thus, not only are the proportions of reagents accurately controlled, resulting in a steadier operation, but there is also an appreciable savings in the cost of direct operating labor.

During the addition of reagents, the mixture is kept well agitated so that the bromine is dispersed therein as quickly as possible in order to prevent a local excess of bromine or overheating in any part of the mixture. Preferably the latter is cooled down to a temperature below room temperature; good results are obtained when operating within the range of about 0 and 15° C., particularly between about 5 and 10° C.

The total time of addition of reagents depends on many factors, such as the quantities treated, the cooling surface of the reactor, and the extent of agitation. When the addition is terminated, the pH of the suspension is adjusted to a range of 9.3–10.5—if not within that range already—and the mixture is maintained under agitation until the end of the reaction.

It has been found that immediately after the addition of the reagents is terminated, there is a very high yield of bromite (oxidizing power of bromite/total oxidizing power), generally about 55–60%. Referring to the accompanying drawing, the bromite content or yield (curve 1), the hypobromite content (curve 2) and the bromate content (curve 3) are represented as a function of time for a mixture obtained by adding successively milk of lime and bromine in substantially stoichiometrical proportions. Time 0 is calculated from the moment when, the addition of reagents being terminated, the pH was adjusted to 10.05. During the remainder of the operation, the mixture was maintained under agitation at a temperature close to 5° C.

The bromite, hypobromite and bromate contents are calculated as percent of total oxidizing power, which total does not vary substantially during the course of the operation and corresponds to the sum of oxidizing power of each of these products. Curve 1 shows that the bromite yield increases first rather quickly as a function of time and reaches 74% in 105 min.; then it increases very slowly (up to 75%) during the next 120 min. The content of hypobromite first decreases rapidly, then more slowly, but still perceptibly, and the bromate content rises slowly and regularly.

If only the bromite yield is considered, obviously it would be better to stop the operation as soon as the yield is close to its peak value, i.e., about 74%. However, in industrial practice, it is advantageous that the quantity of hypobromite left in the solution be as low as possible, for the presence of hypobromite in the mother-liquor appreciably increases the risk of bromite decomposition in the subsequent steps of the manufacture. It has been found that these last steps of the manufacture can be conducted satisfactorily if the operation is continued until the quantity of hypobromite remaining in the mixture represents less than 15%, preferably less than 10% of the total oxidizing power.

It has also been found that, all other conditions being equal, the duration of the reaction, calculated from the time the addition of reagents is ended, depends upon the initial pH of the mixture. For example, it has been observed that for pH values of 9.3 to 10.5 the times of operation have varied from 15 to 240 minutes, the higher the pH, the greater the reaction time.

When the desired hypobromite content of the mixture is reached, the solid precipitate is separated by any suitable means such as, for example, filtration. The product so obtained, still impregnated with mother liquor, can contain more than 50% by weight of calcium bromite. This wet product can either be treated to obtain pure calcium bromite or can be used directly for preparing an alkali metal bromite.

The product impregnated with mother liquor can be purified by washing it with slightly alkaline water (the alkalinity being provided by any alkaline reagent, such as sodium carbonate or hydroxide). For example, by suspending a moist salt containing 18% of calcium bromide as impurity in its weight of water made alkaline to pH 12 and then separating the solid from the wash water, the bromide content can be reduced to less than 4%. Raw calcium bromite product obtained from calcium hypochlorite and lime contains a much smaller quanity of calcium bromide than the product obtained from lime alone. Thus the moist product separated from a lime-hypochlorite mother liquor generally contains less than 2% of calcium bromide, whereas the product prepared from lime alone averages at about 9 to 12% of calcium bromide.

The process of the invention is, therefore, very flexible for, according to the operating conditions, it allows the choice of the most suitable method for preparing a product with a low bromide content by either purifying the salt obtained from lime only, or by directly producing a purer salt from hypochlorite and lime.

If a substantially pure salt is desired, the washed product is dissolved in alkaline water, and the bromite is recrystallized by evaporation and cooling. Thus, there is obtained crystalline calcium bromite with 3 mols of water $Ca(BrO_2)_2 \cdot 3H_2O$ substantially free from calcium hypobromite and bromide and containing only 0.2% of calcium bromate. The composition of this salt after 165 hours in a closed bottle away from light at a temperature of 35° C. was practically unchanged. Calcium bromite, as all other bromites prepared heretofore, is an excellent oxidizing agent in alkaline media.

Another preferred embodiment of the process comprises preparing calcium bromite in two separate steps performed in two different vessels. In the first vessel or mixer, the reagents are introduced as indicated above while controlling the feed rates, preferably using only pH as the controlled variable. In the second vessel or reactor, the mixture is allowed to react after the pH is adjusted to 9.3–10.5, and until the hypobromite contained in the mixture represents less than about 15% of the total oxidizing power as already specified.

When operating in two separate vessels, it is advantageous to use a small mixer for, in this way, the homogeneity of the mixture is obtained more rapidly, thereby effecting better control of the reagents. For example, the size of the mixer can be 6 to 10 times smaller than that of the reactor. When the mixer is full, the contents thereof pass into the reactor, for instance by overflow, by means of a pump or any other suitable means.

A further advantage of operating with two separate vessels, especially with a mixer having a smaller capacity than the reactor is that vigorous agitation of a large volume of liquid is no longer necessary. For, indeed, if a strong agitation is to be preferred in order to obtain a homogeneous mixture, a mild agitation is sufficient to complete the operation in the reactor.

The two step process is also particularly advantageous when it is desired to prepared a final calcium bromite of high purity from technical grade lime which generally contains a significant quantity of insoluble impurities. In this case, it is advisable to provide between the mixing and reaction steps, means for the separation of insoluble materials. This can be done, for example, by a filter placed between the mixer and the reactor, and thus the solution fed to the latter apparatus is clear and free from any insoluble impurities contained in the lime.

One specific application of the calcium bromite obtained according to the process of the present invention is in the preparation of alkali metal bromite solutions. For this purpose a pure product can be used, but it is preferable to employ the product impregnated with mother liquor as it is recovered after filtration. (The purer calcium bromite obtained from calcium hypochlorite and lime, permits the preparation of alkali metal bromite solutions having a lower content of other salts.)

There are several modes of operation for preparing an alkali metal bromite solution. One of them comprises dissolving the moist calcium bromite in water made slightly alkaline, for instance, by the addition of an alkali metal carbonate or hydroxide; then adding gradually to the solution the required quantity of alkali metal carbonate or sulfate. It is also possible to prepare a carbonate or sulfate solution into which the calcium bromite is gradually introduced. In both cases, the mixture is agitated in order to facilitate the double decomposition reaction. The quantity of alkali metal carbonate or sulfate used corresponds substantially to the stoichiometrical amount of dissolvable calcium present in the salt, a slight excess of up to 10% by weight carbonate or sulfate being permissible. The precipitated calcium carbonate or sulfate is then separated from the sodium bromite solution.

When using calcium bromite, it is possible to prepare concentrated solutions of sodium bromite containing up to 500 g./l. available bromine in the form of bromite. These solutions have the outstanding advantage of being much purer than those obtained heretofore by the usual methods. Hence, in a sodium bromite solution prepared according to the present process and containing 100 mols of dissolved salts, the proportions are about: 70 to 80 mols of bromite and 30 to 20 mols of other salts (bromide, bromate, etc.) whereas in the solutions heretofore obtained industrially the proportion is about 10 mols of bromite for 90 mols of other salts.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Example 1

The starting material used was a commercial-grade hydrated lime containing 94.5% of $Ca(OH)_2$. A quantity of milk of lime containing 0.5 kg. of hydrated lime (which is the ⅕ part of the total quantity to be introduced) was fed into a vessel equipped with a stirring device. This bottom layer was cooled to 5° C., and 0.990 kg. of bromine was added therein while stirring; then milk of lime and bromine were alternately added at controlled feed rates so that the stoichiometric excess of lime relative to the bromine present did not exceed 0.7% by weight of mixture and that, during the addition of bromine, the pH did not fall below 10.

After all the hydrated lime (2.5 kg.) as milk of lime was introduced into the reaction vessel, the pH of the medium was 10.05. Bromine was then added very slowly so as to adjust the pH to 9.62. The addition of reagents lasted 125 minutes; a total quantity of 4.955 kg. of bromine was added, and the weight ratio $Ca(OH)_2$/water in the mixture was 32.5%. The bromite content of the reaction mixture was 64% relative to the total oxidizing power.

The mixture was stirred continuously for another 125 minutes while the temperature was maintained at 5° C. The bromite yield then reached 71%, and the hypobromite content of the mixture decreased to 9.6% of the total oxidizing power.

The solid precipitate was separated from the mother liquor by filtration and a moist product was obtained having the following composition in percent by weight:

| | |
|---|---|
| $Ca(BrO_2)_2$ | 57.5 |
| $Ca(BrO)_2$ | 1.4 |
| $Ca(BrO_3)_2$ | 1.2 |
| $CaBr_2$ | 9.6 |
| $Ca(OH)_2$ | 1.8 |

A portion of this moist product (1.365 kg.) was used to prepare a sodium bromite solution. A quantity of 0.437 kg. of sodium carbonate was dissolved in 7 kg of water; then the moist calcium bromite was added gradually while stirring. The mixture was agitated for one hour, then filtered.

The resultant clear filtrate contained 254 g./l. of available bromine in the form of sodium bromite and its Ca content was less than 0.003%. Of 100 mols of dissolved salts, 76 mols were sodium bromite, the other salts being sodium bromide (20.3 mols), bromate (2.6 mols) and hypobromite (1.1 mol).

The remaining portion of the moist calcium bromite was washed by suspending it in its own weight of alkaline water having a pH of 12. The salt was separated by filtration, then dissolved in alkaline water at a pH of 12 to obtain a saturated solution at ambient temperature. After filtering the solution to remove any undissolved calcium carbonate, said solution was evporated under vacuum while maintaining the temperature at about 20° C. After elimination of 40% of the water content of the solution, the temperature was reduced to 0° C., and the precipitated salt was separated and dried in the presence of potassium hydroxide, the temperature being maintained between 5 and 10° C. The analysis of the salt obtained showed that it consisted essentially of crystalline calcium bromite $(BrO_2)_2Ca \cdot 3H_2O$ with only 0.18% of calcium bromate as impurity.

Example 2

In a mixer of 25 liter capacity, there were introduced: (1) bromine; and (2) milk of lime prepared from hydrated lime containing 97.5% of $Ca(OH)_2$, the ratio of $Ca(OH)_2$ to water being 34.8%. The bromine was added slowly and continuously, and the milk of lime was added by means of an automatic valve allowing the feed rate to be adjusted in response to the pH, the latter being constantly maintained between 10.3 and 10.7. By cooling the mixture was maintained at 0–5° C., while, by vigorous agitation, a homogeneous mixture was rapidly obtained.

The resultant mixture obtained from 57.7 kg. of bromine, 26 kg. of lime, and 73 kg. of water was then pumped to a 200 liter reactor. The pH of the mixture was adjusted to 10.2 by adding the required amount of bromine while the mixture was kept mildly agitated for 150 minutes. The bromite yield was then 72.8% and the hypobromite in the solution was only 11.1% of the total oxidizing power.

The precipitate was separated from the mother liquor by filtration and a moist solid was obtained having the following composition in percent by weight:

| | Percent |
|---|---|
| $Ca(BrO_2)_2$ | 47.6 |
| $Ca(BrO)_2$ | 0.9 |
| $Ca(BrO_3)_2$ | 2.2 |
| $CaBr_2$ | 11.2 |
| $Ca(OH)_2$ | 3.4 |

A quantity of 1 kg. of this solid was suspended in 1 kg. of water; to this suspension, cooled to 12° C., there was gradually added a solution of lithium hydroxide prepared by dissolving 127 g. of LiOH in 2.5 liters of water. After the mixture was agitated for half an hour, the liquid was filtered to separate the precipitated $Ca(OH)_2$. The resultant filtrate contained 300 g./l. of available bromine in the form of lithium bromite.

Example 3

A technical grade of calcium hypochlorite having the following composition:

| | Percent |
|---|---|
| $Ca(ClO)_2$ | 67.1 |
| $Ca(OH)_2$ | 20.6 |
| $CaCl_2$ | 7.9 |
| $CaCO_3$ | 3.3 | was used to prepare an aqueous suspension containing 6.7 kg. of hypochlorite and 13 kg. of water. To this suspension kept strongly agitated at 5° C., only bromine was first added. Then, when the pH of the mixture reached 10.6 both bromine and milk of lime were added (the latter prepared from commercial lime containing 87% of $Ca(OH)_2$), and the feed rates were adjusted to maintain the pH at 10.6.

After the addition of 0.93 kg. of $Ca(OH)_2$ in the form of milk of lime, the pH of the mixture was adjusted to 10 by adding the required amount of bromine. The mixture was kept agitated and cooled so that the temperature was maintained at 9° C. After 20 minutes, the bromite yield reached 70.8%, and the hypobromite content represented only 5.2% of the total oxidizing power.

The precipitate was separated from the mother liquor, and a moist solid was obtained having the following composition:

| | Percent |
|---|---|
| $Ca(BrO_2)_2$ | 62.5 |
| $Ca(BrO)_2$ | 1.5 |
| $Ca(BrO_3)_2$ | 0.9 |
| $Ca(OH)_2$ | 1.25 |

This salt was found to contain less than 2% of halides (calcium chloride + calcium bromide).

One kg. of this moist solid was suspended in 4.1 liters of water maintained at 12° C. and adjusted to a pH of 12. To this suspension, and during a period of 30 minutes, 326 g. of $Na_2CO_3$ were admixed. The $CaCO_3$ precipitate was filtered out and a sodium bromite solution was obtained containing 334 g./l. of available bromine in the form of bromite.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof can make various changes and modifications of the invention to adapt it to various usages and conditions. Consequently, such changes and modifications are properly, equitably, and intended to be, within the full range of equivalence of the following claims.

What is claimed is:

1. A process for the production of calcium bromite directly in solid form, said process comprising:
   (A) mixing and reacting bromine and calcium hydroxide together, optionally with calcium hypochlorite, to form calcium hypobromite, calcium bromide, calcium bromite, and calcium bromate, the mixing conditions being:
      (1) at lower than about 20° C. to higher than the freezing point of the mixture;
      (2) during the entire mixing step maintaining the pH of the mixture higher than about 10; and
      (3) during at least the period after the quantity of calcium bromide reaches 20% by weight of the mixture until the end of the mixing step, providing at least one of the following:
         (a) adjusting the addition of calcium hydroxide and bromine to the mixture to maintain either a pH lower than 11 in the absence of hypochlorite, or a pH lower than 11.8 in the presence of hypochlorite,
         (b) adding calcium hydroxide and bromine into the mixture and maintaining therein substantially equimolar proportions of these reactants;
   (B) after the addition of reagents is completed, adjusting the pH to about a range of 9.3–10.5, if not already in said range;
   (C) reacting the constituents of the mixture sufficiently to obtain a precipitate comprising a major amount by weight of calcium bromite; and
   (D) recovering the resultant precipitate from its mother liquor.

2. A process as defined by claim 1 wherein in step (C) the reaction is maintained for a sufficient time so that the quantity of calcium hypobromite remaining in the mixture represents less than about 15% of the total oxidizing power of the mixture.

3. A process as defined by claim 1 wherein the calcium hydroxide is employed in the form of milk of lime, the weight ratio of $Ca(OH)_2$ to water being not more than 45% in the mixture.

4. A process as defined by claim 3 wherein the weight ratio is 30–40%.

5. A process as defined by claim 1 wherein said calcium hypochlorite is employed in step (A) in a molar ratio of hypochlorite to lime of not more than 1.5.

6. A process as defined by claim 1 wherein said substantially equimolar addition of bromine and calcium hydroxide such that less than 1% by weight of the mixture is represented by stoichiometrically excess lime.

7. A process as defined by claim 1 wherein hypochlorite is absent and the pH in step (a) is 10.2–10.8.

8. A process as defined by claim 1 wherein the mixing temperature is 0–15° C.

9. A process as defined by claim 1 wherein the mixing temperature is 5–10° C.

10. A process as defined by claim 1 wherein said at least the period in step (2) comprises the entire mixing step.

11. A process as defined by claim 1 wherein said at least the period in step (2) comprises the time after the quantity of calcium bromide reaches 15% by weight to the end of the mixing step.

12. A process as defined by claim 1 wherein in step (C) the reaction is maintained for a sufficient time so that the quantity of calcium hypobromite remaining in the mixture represents less than about 10% of the total oxidizing power of the mixture.

References Cited

UNITED STATES PATENTS

| | | | |
|---|---|---|---|
| 3,085,854 | 4/1963 | Meyback et al. | 23—85 |
| 3,095,267 | 6/1963 | Kircher et al. | 23—85 |
| 3,178,262 | 4/1965 | Meybeck et al. | 23—85 |
| 3,223,477 | 12/1965 | Breiss et al. | 23—85 |

FOREIGN PATENTS 604,100   8/1960   Canada.

EDWARD STERN, Primary Examiner

U.S. Cl. X.R.

23—86, 90